(12) United States Patent
Chang et al.

(10) Patent No.: US 12,262,299 B2
(45) Date of Patent: Mar. 25, 2025

(54) MULTI-LINK DEVICE AND METHOD OF SWITCHING OPERATION MODE OF MULTI-LINK DEVICE

(71) Applicant: Realtek Semiconductor Corp., HsinChu (TW)

(72) Inventors: Chung-Yao Chang, HsinChu (TW); Chuan-Hu Lin, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 414 days.

(21) Appl. No.: 17/839,493

(22) Filed: Jun. 14, 2022

(65) Prior Publication Data

US 2023/0164663 A1 May 25, 2023

(30) Foreign Application Priority Data

Nov. 24, 2021 (TW) ................................. 110143771

(51) Int. Cl.
*H04W 4/00* (2018.01)
*H04W 40/12* (2009.01)
*H04W 76/15* (2018.01)
*H04W 84/12* (2009.01)

(52) U.S. Cl.
CPC ........... *H04W 40/12* (2013.01); *H04W 76/15* (2018.02); *H04W 84/12* (2013.01)

(58) Field of Classification Search
CPC ...... H04W 40/12; H04W 76/15; H04W 84/12

USPC .......................................................... 370/338
See application file for complete search history.

(56) References Cited

U.S. PATENT DOCUMENTS

| | | | |
|---|---|---|---|
| 11,722,253 B2* | 8/2023 | Jauh | H04L 1/1893 370/338 |
| 11,917,628 B2* | 2/2024 | Lan | H04W 72/0453 |
| 2019/0037418 A1* | 1/2019 | Gunasekara | H04W 52/40 |
| 2019/0306884 A1* | 10/2019 | Palat | H04W 74/0816 |
| 2019/0313271 A1* | 10/2019 | Yiu | H04W 72/04 |
| 2021/0014923 A1* | 1/2021 | Palat | H04W 76/19 |
| 2021/0037414 A1 | 2/2021 | Ryu | |
| 2021/0084711 A1 | 3/2021 | Park | |
| 2021/0144698 A1* | 5/2021 | Kwon | H04W 76/14 |
| 2021/0274489 A1* | 9/2021 | Fang | H04W 72/0446 |
| 2021/0289575 A1* | 9/2021 | Cherian | H04L 69/14 |
| 2023/0171831 A1* | 6/2023 | Gan | H04W 74/0866 370/328 |
| 2023/0189341 A1* | 6/2023 | Gan | H04W 76/15 370/329 |
| 2023/0292402 A1* | 9/2023 | Park | H04W 74/0816 |
| 2024/0237071 A1* | 7/2024 | Lu | H04W 76/19 |

* cited by examiner

*Primary Examiner* — Marceau Milord
(74) *Attorney, Agent, or Firm* — Winston Hsu

(57) ABSTRACT

A method of switching an operation mode of a first multi-link device includes the first multi-link device establishing a plurality of links to a second multi-link device, and the first multi-link device determining according to a channel condition whether to receive a plurality of streams via the plurality of links or via one of the plurality of links.

10 Claims, 5 Drawing Sheets

MULTI-LINK DEVICE AND METHOD OF SWITCHING OPERATION MODE OF MULTI-LINK DEVICE

BACKGROUND OF THE INVENTION

1. Field of the Invention

The invention relates to a Wi-Fi network, and in particular, to a multi-link device and a method of switching an operation mode of a multi-link device.

2. Description of the Prior Art

IEEE 802.11be standard specifies communication protocols of wireless access technologies for the next generation of Wi-Fi 7, supporting multi-link multi-radio (MLMR), 320 MHz bandwidth, 4096-quadrature amplitude modulation (QAM), and 16 spatial streams, thereby achieving high speed rate, high throughput, and low latency.

SUMMARY OF THE INVENTION

According to an embodiment of the invention, a method of switching an operation mode of a first multi-link device (MLD) comprising the first multi-link device establishing a plurality of links to a second multi-link device, and the first multi-link device determining, according to a channel condition, whether to receive a plurality of streams via the plurality of links or via one of the plurality of links.

According to another embodiment of the invention, a first multi-link device comprising a plurality of radio circuits and a processor coupled to the plurality of radio circuits. The plurality of radio circuits are used to establish a plurality of links to a second multi-link device. The processor is used to determine whether to receive a plurality of streams via the plurality of links or via one of the plurality of links.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
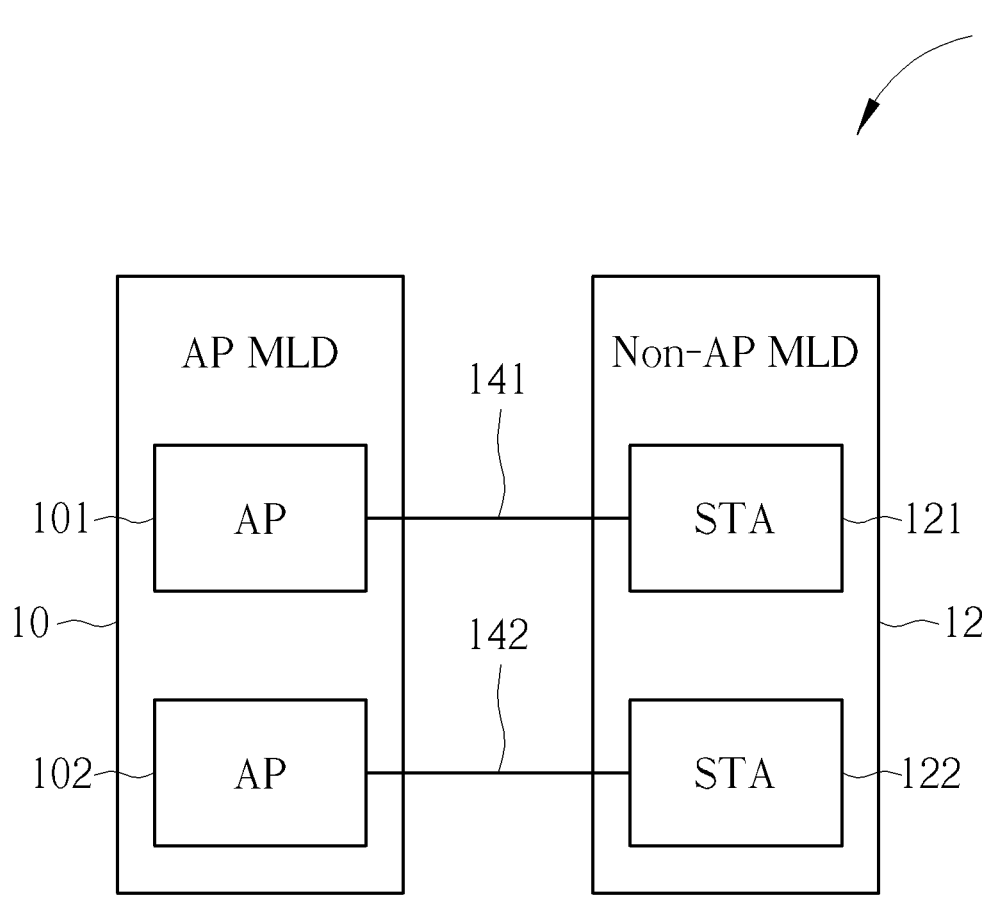
FIG. 1 is a schematic diagram of a multi-link communication system according to an embodiment of the present invention.

FIG. 1 is a schematic diagram of a multi-link communication system 1 according to an embodiment of the invention. The multi-link communication system 1 includes an AP multi-link device (AP MLD) 10 and a non-AP multi-link device (non-AP MLD) 12. The multi-link communication system 1 is compatible with IEEE 802.11 protocol, for example, the IEEE 802.11be protocol.

Figure 2:
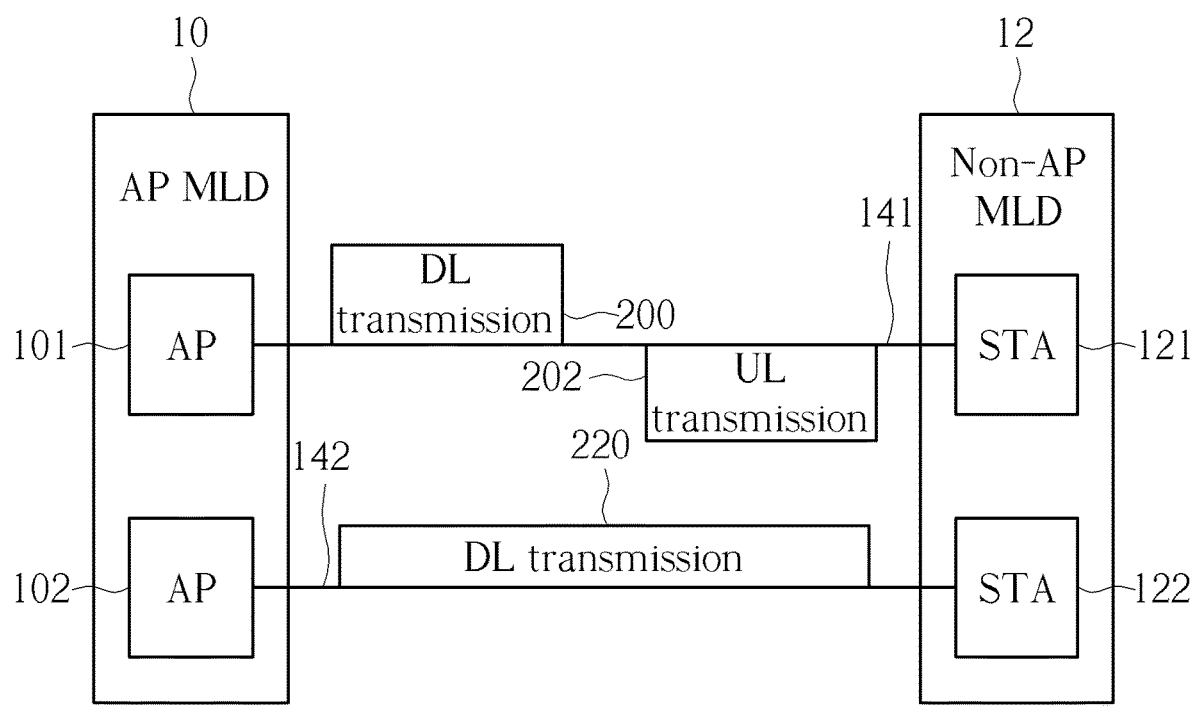
FIG. 2 is a schematic diagram of a transmission sequence of the simultaneous transmit and receive mode.
Figure 3:
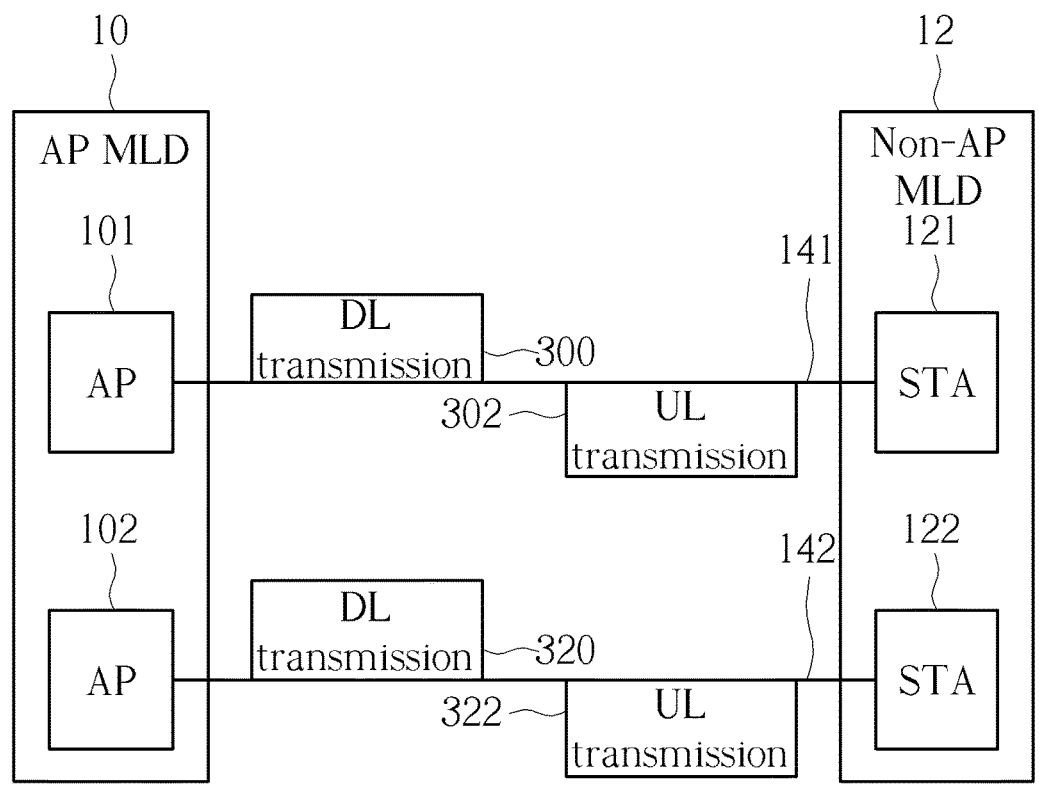
FIG. 3 is a schematic diagram of a transmission sequence of the non-simultaneous transmit and receive mode.
Figure 4:
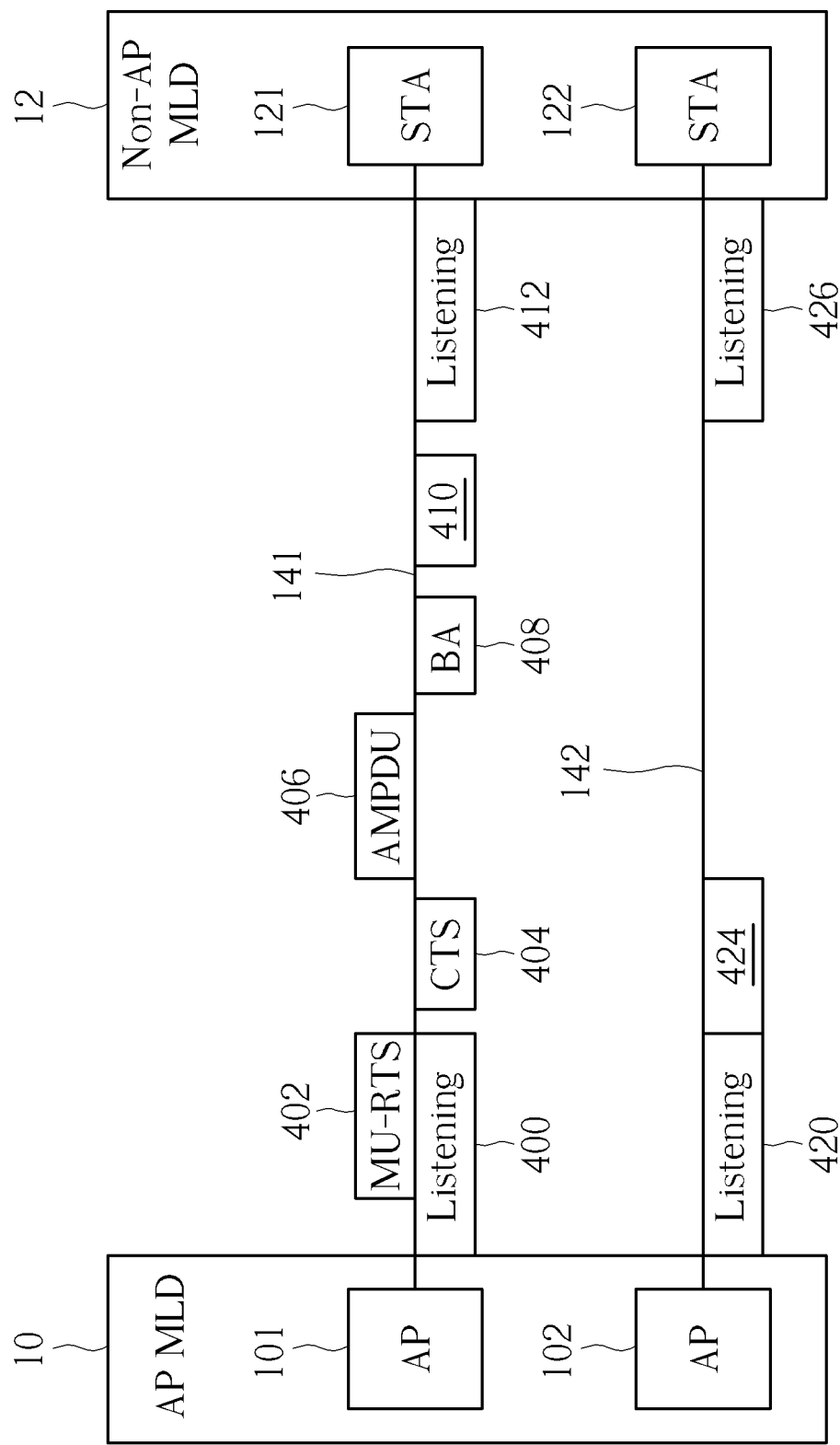
FIG. 4 is a schematic diagram of a transmission sequence of the enhanced mode of the multi-link multi-radio circuit.

The AP MLD 10 includes access points (AP) 101 and 102, and the non-AP MLD 12 includes stations (STA) 121 and 122. The APs 101 and 102, and the STAs 121 and 122 may be logical devices, and may be implemented by hardware, software, firmware, or a combination thereof. The AP MLD 10 and the non-AP MLD 12 may establish links 141 and 142 therebetween. For example, the AP 101 may communicate with the STA 121 via the link 141, and the AP 102 may communicate with the STA 122 via the link 142. The non-AP MLD 12 may include 2 sets of full function radio circuits and support an enhanced multi-link multi-radio (EMLMR) mode, and may switch an operation mode according to the channel condition. For example, the operation modes may be switched to a baseline mode or an enhanced mode. The baseline mode may also be referred to as a multi-link multi-radio (MLMR) mode, and the enhanced mode may also be referred to as an enhanced multi-link multi-radio (EMLMR) mode. The two radio circuits of the non-AP MLD 12 may be respectively used for data transmissions at two identical or different frequency bands. For example, the 2 frequency bands may include 2.4 GHz and 5 GHz channels. In another example, the 2 frequency bands may include 5 GHz and 6 GHz channels. When the EMLMR mode is enabled, the non-AP MLD 12 may communicate with the AP MLD 10 using the enhanced mode. When the EMLMR mode is disabled, the non-AP MLD 12 may communicate with the AP MLD 10 using the baseline mode. In the baseline mode, the non-AP MLD 12 may simultaneously use 2 sets of radio circuits to perform transmissions with the AP MLD 10 via both the link 141 and the link 142, N spatial streams (Nss=N) may be transmitted over the link 141, and N spatial streams (Nss=N) may be transmitted over the link 142, N being greater than or equal to 1. In the enhanced mode, the non-AP MLD 12 may use 1 set of the radio circuit to perform transmissions with the AP MLD 10 via one of the link 141 and the link 142, 2N spatial streams (Nss=2N) may be transmitted over one of the link 141 and the link 142, increasing the throughput by adjusting the number of spatial streams (Nss=2N) on the link. In the baseline mode, the non-AP MLD 12 may operate in a simultaneous transmit and receive (STR) mode or a non-simultaneous transmit and receive (NSTR) mode. In the enhanced mode, the non-AP MLD 12 may operate in the EMLMR mode. When the non-AP device 12 includes only a single set of full function radio circuit, also referred to as a multi-link single radio circuit, it is not possible to perform transmissions between the non-AP device 12 and the AP MLD 10 using N spatial streams on both the link 141 and the link 142. However, the non-AP device 12 can still operate in the EMLSR mode to perform transmissions with the AP MLD 10 using 2N spatial streams on one of the link 141 and the link 142. Since the multi-link single radio circuit may only perform transmissions in the EMLSR mode, there is no need to switch the operation mode of the multi-link single radio circuit. FIGS. 2 to 4 show schematic diagrams of transmission sequences of the STR mode, the NSTR mode and the enhanced mode of the multi-link multi-mode radio circuit, respectively, and explanation therefor will be detailed in the subsequent paragraphs.

FIG. 2 shows a schematic diagram of a transmission sequence of the STR mode of the baseline mode of the multi-link multi-mode radio circuit. When channel spacing between channels used by the two radio circuits of the non-AP MLD 12 is sufficient, e.g., the two radio circuits use 2.4G and 5G channels, respectively, the transmissions on the link 141 and the link 142 will not interfere with each other, and therefore, the non-AP MLD 12 may adopt the STR mode to perform transmissions with the AP MLD 10. In the STR mode, the non-AP MLD 12 uses 2 sets of radio circuits to perform transmissions via the link 141 and the link 142, and the channel access of the link 141 and the link 142 are independent of each other. The uplink transmissions and downlink transmissions on the link 141 and the link 142 do not need to be synchronized. For example, in FIG. 2, an uplink transmission 200 and a downlink transmission 202 are performed on the link 141, while a downlink transmission 220 is performed on the link 142.

FIG. 3 shows a schematic diagram of a transmission sequence of the NSTR mode of the baseline mode of the multi-link multi-mode radio circuit. When channel spacing between channels used by the two radio circuits of the non-AP MLD 12 is insufficient, e.g., the two radio circuits use 5G and 6G channels, respectively, the transmissions on the link 141 and the link 142 may interfere with each other, and therefore, the non-AP MLD 12 may adopt the NSTR mode to perform transmissions with the AP MLD 10. In the NSTR mode, the non-AP MLD 12 uses 2 sets of radio circuits to perform transmissions via the link 141 and the link 142. If data packets are transmitted over one of the link 141 and the link 142, there will be no packet transmitted over the other one of the link 141 and the link 142. As a consequence, uplink transmissions or downlink transmissions will be transmitted over the link 141 and the link 142 simultaneously. In addition, in order to avoid in-device coexistence interference between the link 141 and the link 142, the uplink transmissions and downlink transmissions on the link 141 and the link 142 must be synchronized, and must comply with the physical protocol data unit (PPDU) end time alignment, the start time sync PPDU medium access, and the medium access recovery in the physical layer protocol as specified by the IEEE 802.11be, resulting in a lower throughput in the NSTR mode than that in the STR mode. For example, in FIG. 3, a downlink transmission 300 on the link 141 and a downlink transmission 320 on the link 142 may be synchronized; an uplink transmission 302 on the link 141 and an uplink transmission 322 on forward link 142 may be synchronized.

FIG. 4 shows a schematic diagram of a transmission sequence of the enhanced mode of the multi-link multi-mode radio circuit. In the enhanced mode, each data transmission may be performed over one of the link 141 and the link 142. For example, in FIG. 4, the non-multi-link AP device 12 listens to messages (400 and 420) on the link 141 and 142, detects a multi-user request to send (MU-RTS) frame 402 from the link 141, and is ready to receive data from the link 141. When ready, the non-AP MLD 12 transmits a clear to send (CTS) frame 404 over the link 141, and performs a receive radio link switch (Rx chain switch) 424 to switch a radio chain of the link 142 to the link 141. In response to the CTS 404, the AP MLD 10 transmits an aggregated media access control protocol data unit (AMPDU) frame 406 on the link 141 using 2N spatial streams. After receiving the AMPDU frame 406, the non-AP MLD 12 transmits a block acknowledgment (BA) frame 408 over the link 141, performs a receive wireless link switch 410 to switch the radio chain of the link 142 back to the link 142, and then the non-AP MLD 12 listens to the messages on the link 141 and the link 142 once again (412 and 426).

The enhanced mode enables the non-AP MLD 12 to use all the available spatial streams (Nss=2N) for transmissions over one of the link 141 and the link 142, thereby increasing the overall throughput.

Figure 5:
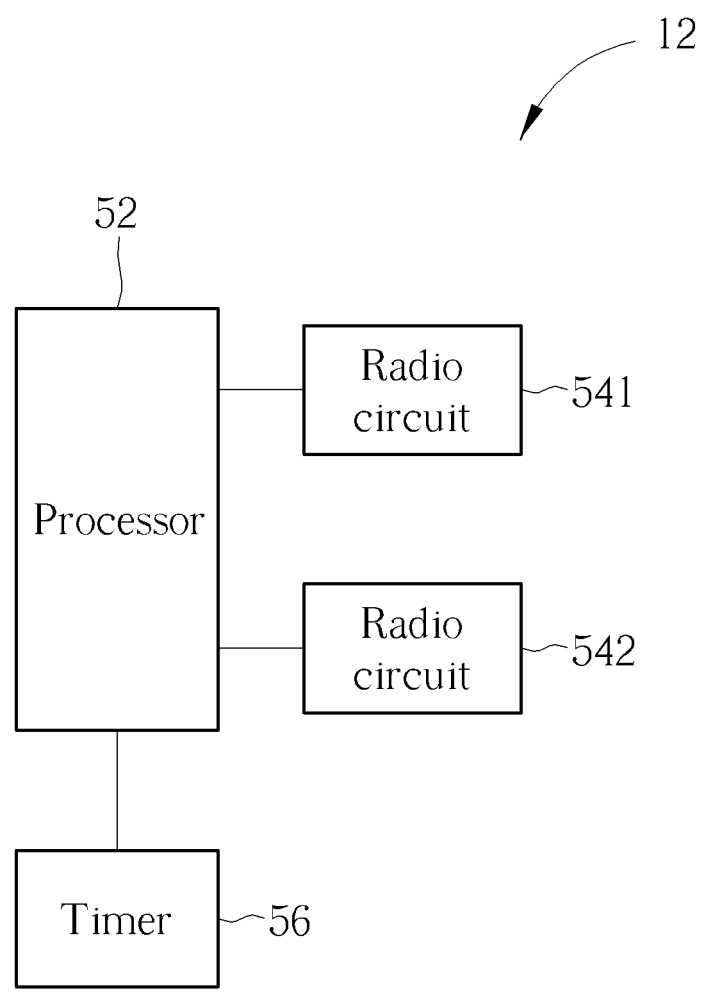
FIG. 5 is a block diagram of the non-AP MLD in FIG. 1.

FIG. 5 is a block diagram of the non-AP MLD 12. The non-AP MLD 12 includes a processor 52, radio circuits 541 and 542, and a timer 56. The processor 52 is coupled to the radio circuit 541, the radio circuit 542, and the timer 56.

The radio circuits 541 and 542 may include respective antennas, transceivers, and other radio frequency components. The radio circuit 541 may establish the link 141 with the AP MLD 10, and the radio circuit 542 may establish the link 142 with the AP MLD 10. The processor 52 may determine whether to receive a plurality of streams via one of the link 141 and the link 142 or via the link 141 and the link 142 according to the channel condition. When the channel condition is busy, the probability of the link 141 and the link 142 transmitting simultaneously will decrease, and thus, the processor 52 determines to switch to the enhanced mode to receive a plurality of spatial streams via one of the link 141 and the link 142. When the channel condition is idle, the probability of the link 141 and the link 142 transmitting simultaneously will increase, and thus, the processor 52 determines to switch to the baseline mode to receive the plurality of streams via the link 141 and the link 142.

In some embodiments, the processor 52 may generate a channel busy ratio (CBR) of the non-AP MLD 12 according to a channel busy time $T_b$ and a data transmission time $T_{tx}$ during a measurement time $T_m$, so as to estimate the channel condition. The channel busy ratio CBR of the non-AP MLD 12 may be expressed by Equation (1):

$$CBR=(T_b+T_{tx})/T_m \qquad \text{Equation (1)}$$

where $T_m$ is the measurement time;

$T_b$ is the channel busy time; and $T_{tx}$ is the data transmission time of the non-AP MLD 12.

The channel busy time $T_b$ may be obtained via a physical carrier sense mechanism or a virtual carrier sense mechanism. In the physical carrier detection mechanism, the non-AP MLD 12 may detect whether the channel power exceeds a threshold of clear channel assessment (CCA), e.g., the threshold of CCA may be −82 dBm. If the channel power exceeds the threshold, the processor 52 may determine that the channel is busy and compute the channel busy time $T_b$. In the virtual carrier detection mechanism, the non-AP MLD 12 may monitor for a network allocation vector (NAV) in an RTS message. When NAV is not 0, the processor 52 may determine that the channel is busy and compute the channel busy time $T_b$. When CBR approaches 1, the channel may be busy or congested.

In other embodiments, the AP MLD 10 may periodically broadcast a beacon frame containing a network load reports, and the processor 52 of the non-AP MLD 12 may generate a channel busy ratio CBR_OBSS of an overlapping basic service set (OBSS) according to the network load report of the multi-link communication system 1. Since the other APs near the multi-link communication system 1 may perform data transmission at the same time, the AP MLD 10 may collect the traffic of other nearby APs to generate the network load report. The network load report may be a Qload report, and the format of the Qload report is shown in Table 1:

TABLE 1

| Element identifier | Length | Potential traffic self | Allocated traffic self | Allocated traffic shared | EDCA factor | HCCA peak | HCCA factor | Overlap | Sharing policy | Optional sub-elements |
|---|---|---|---|---|---|---|---|---|---|---|

Where Element identifier represents the number of the Qload report;

Length represents the length of the Qload report;

Potential traffic self represents the longest medium time allocated by the AP MLD 10 during a predetermined period of time, e.g., 7 days;

Allocated traffic self represents the current medium time allocated by the AP MLD 10, including an average and a standard deviation;

Allocated traffic shared represents the medium time allocated to all APs (including the AP MLD 10) near the AP MLD 10, including an average $\mu_s$ and a standard deviation $\sigma_s$;

Enhanced distributed channel access (EDCA) factor represents the medium time using the EDCA mechanism;

Hybrid coordinated channel access (HCCA) peak indicates the peak medium time using the HCCA mechanism;

HCCA factor represents the medium time using the HCCA mechanism;

Overlap represents the number of APs using the same channel;

Sharing strategy represents a channel sharing strategy adopted by the AP; and

Optional sub-components represent other information.

In some embodiments, the non-AP MLD 12 may generate a long-term channel busy ratio CBR_OBSS1 according to the EDCA factor and the HCCA factor in the Qload report, and is expressed by Equation (2):

$$CBR\_OBSS1 = (EDCA\ factor + HCCA\ factor)/64 \quad \text{Equation (2)}$$

64 in Equation (2) represents the decimal point precision of EDCA factor and HCCA factor.

In other embodiments, the non-AP MLD 12 may generate a short-term channel busy ratio CBR_OBSS2 according to the allocated traffic shared in the Qload report, and is expressed by Equation (3):

$$CBR\_OBSS2 = \mu_s + 2\sigma_s \quad \text{Equation (3)}$$

Where $\mu_s$ is the average of the medium time in the allocated traffic shared field; and $\sigma_s$ is the standard deviation of the medium time in the allocated traffic shared field.

When the long-term channel busy ratio CBR_OBSS1 or the short-term channel busy ratio CBR_OBSS2 approaches 1, the channel may be busy or congested. The processor 52 may determine the channel condition according to the channel busy ratio CBR of the non-AP MLD 12, the long-term channel busy ratio CBR_OBSS1, and/or the short-term channel busy ratio CBR_OBSS2. Since the short-term channel busy ratio CBR_OBSS2 reflects the recently allocated medium time of the overlapping basic service set, the short-term channel busy ratio CBR_OBSS2 is more accurate than the long-term channel busy ratio CBR_OBSS1.

In some embodiments, the non-AP MLD 12 may set the timer 56 to periodically check the channel condition, so as to determine whether to switch the operation mode. In some embodiments, if the non-AP MLD 12 is going to enter the NSTR mode, since the throughput of the NSTR mode is low, the processor 52 determines to switch to the enhanced mode to receive 2N spatial streams via one of the link 141 and the link 142, thereby enhancing the throughput.

In this manner, the non-AP MLD 12 may switch the operation mode according to the channel condition, increasing the overall throughput by exploiting flexibility of the multi-link and multi-radio circuit.

Figure 6:
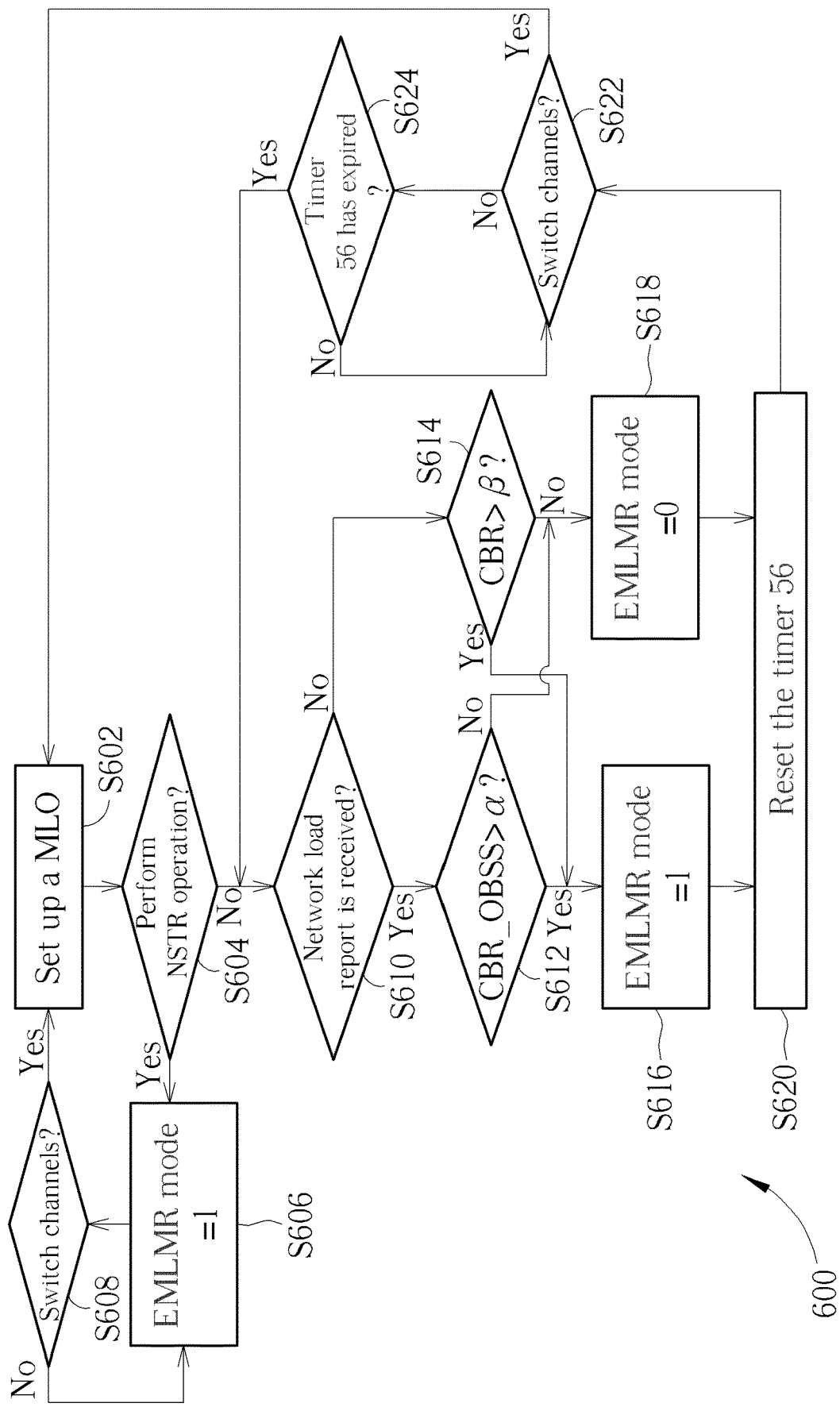
FIG. 6 is a flowchart of the method of switching the operation mode of the non-AP MLD in FIG. 1.

FIG. 6 is a flowchart of the method 600 of switching the operation mode of the non-AP MLD 12. The method 600 includes Steps S602 to S624. Steps S602 to S608 are used to switch to the enhanced mode for data transmission upon determining the NSTR mode is used for transmission, and Steps S610 to S618 are used to determine whether to use the baseline mode or the enhanced mode according to the channel condition. Steps S620 to S624 are used to periodically determine the channel condition. Any reasonable step change or adjustment is within the scope of the disclosure. Steps S602 to S624 are detailed as follows:

Step S602: The processor 52 sets up a multi-link operation (MLO);

Step S604: The processor 52 determines whether to perform a non-simultaneous transmit and receive operation? If so, go to Step S606; if not, go to Step S610;

Step S606: The processor 52 sets the EMLMR mode to 1;

Step S608: The processor 52 determines whether to switch channels? If so, go to Step S602; if not, go to Step S606;

Step S610: The processor 52 determines whether the network load report is received? If so, go to Step S612; if not, go to Step S614;

Step S612: The processor 52 determines whether the channel busy ratio CBR_OBSS exceeds a predetermined value α? If so, go to Step S616; if not, go to Step S618;

Step S614: The processor 52 determines whether the channel busy ratio CBR_OBSS exceeds a predetermined value β? If so, go to Step S616; if not, go to Step S618;

Step S616: The processor 52 sets the EMLMR mode to 1; go to Step S620;

Step S618: The processor 52 sets the EMLMR mode to 0;

Step S620: The processor 52 resets the timer 56;

Step S622: The processor 52 determines whether to switch channels? If so, go to Step S602; if not, go to Step S624;

Step S624: The processor 52 determines whether the timer 56 has expired? If so, go to Step S610; if not, go to Step S622.

In Step S602, the non-AP MLD 12 configures a multi-link operation setting, and the processor 52 sets the EMLMR mode to 0 to switch the non-AP MLD 12 to the baseline mode. In Step S604, the processor 52 sets the operation mode of the non-AP MLD 12 to the STR mode or the NSTR mode according to the channel spacing between the link 141 and the link 142. For example, when the channel spacing between the link 141 and the link 142 is less than 1 GHz, the processor 52 sets the operation mode of the non-AP MLD 12 to the NSTR mode. When the channel spacing between the link 141 and the link 142 exceeds 1 GHz, the processor 52 sets the operation mode of the non-AP MLD 12 to the STR mode. In Step S606, if the operation mode is the NSTR mode, the processor 52 sets the EMLMR mode to 1 to switch the non-AP MLD 12 to the enhanced mode, so as to receive 2N spatial streams via one of the link 141 and the link 142, thereby enhancing the throughput. In Step S608, if one of the radio circuit 541 and the radio circuit 542 detects that the beacon contains channel switch announcement (CSA) information, the processor 52 determines that the channel is going to be switched. Since a channel switch is going to occur, return to Step S602 to reset the operation mode of the non-AP MLD 12. If no CSA information is detected, return to Step S606 and continue to use the enhanced mode to receive 2N spatial streams from one of the link 141 and the link 142.

If in Step S604, the processor 52 sets the operation mode of the non-AP MLD 12 to the non-NSTR mode (i.e., STR mode), the processor 52 further determines whether a network load report is received (Step S610). If so, the processor 52 generates the channel busy ratio CBR_OBSS of the overlapping service set according to the network load report, and estimates the channel condition according to the channel busy ratio CBR_OBSS (Step S612). The channel busy rate CBR_OBSS may be the long-term channel busy rate CBR_OBSS1 or the short-term channel busy rate CBR_OBSS2. In some embodiments, the processor 52 generates the short-term channel busy ratio CBR_OBSS2 according to the allocated traffic shared in the Qload report to serve as the channel busy ratio CBR_OBSS of the overlapping basic service set, thereby increasing the accuracy of the channel busy ratio. In some embodiments, the processor 52 may generate the long-term channel busy ratio CBR_OBSS1 to serve as the channel busy ratio CBR_OBSS of the overlapping basic service set. If the channel busy ratio CBR_OBSS exceeds a predetermined value α, the channel condition is busy; and if the channel busy ratio CBR_OBSS is less than the predetermined value α, the channel condition is idle. The predetermined value α may be between 0 and 1, for example, the predetermined value α may be between 0.4 and 0.5.

If in Step S610, the processor 52 determines that the network load report is not received, a channel busy ratio CBR of the non-AP MLD 12 may be generated. If the channel busy ratio CBR exceeds a predetermined value β, the channel condition is busy; and if the channel busy ratio CBR is less than the predetermined value β, the channel condition is idle. The predetermined value β may range between 0 and 1, for example, the predetermined value β may be between 0.4 and 0.5. The predetermined value α and the predetermined value β may be equal or different.

If in the Step S612 or Step S614, the processor 52 determines that the channel condition is busy, then the EMLMR mode is set to 1 to switch the non-AP MLD 12 to the enhanced mode, so as to receive 2N spatial streams via one of the link 141 and the link 142, thereby enhancing the throughput (Step S616). If in the Step S612 or Step S614, the processor 52 determines that the channel condition is idle, then the EMLMR mode is set to 0 to switch the non-AP MLD 12 to the baseline mode, so as to receive N spatial streams via the link 141 and the link 142, respectively (Step S618).

In Step S620, the processor 52 resets the timer 56 to a predetermined time. The predetermined time may be longer than dot11QLoadReportIntervalDTIM as specified in IEEE 802.11be standard. In Step S622, if the radio circuit 541 or the radio circuit 542 detects that the beacon contains CSA information, the processor 52 determines that the channel is going to be switched. Since a channel switch is going to occur, return to Step S602 to reset the operation mode of the non-AP MLD 12. If no CSA information is detected, proceed to Step S624 to determine whether the timer 56 has expired. If the timer 56 has not expired, the processor 52 continues to determine whether to switch the channel (Step S622). If the timer 56 has expired, the processor 52 sets the operation mode according to the channel condition (S610 to S618).

In Steps S602, S606, S616, and S618, upon the switch of the operation mode of the non-AP MLD 12, e.g., the EMLMR mode changes from 1 to 0, or from 0 to 1, the radio circuit 541 and/or the radio circuit 542 sends an enhanced multi-link (EML) operation mode notification frame with the EMLMR mode setting to the AP MLD 10 via the link 141 and/or the link 142, notifying the AP MLD 10 to change the transmission mode thereof.

While in the embodiments of FIGS. 1 to 6 the non-AP MLD 12 only include two sets of radio circuits and only two links are established, the non-AP MLD 12 may further include more sets of radio circuits and establish more links. Those skilled in the art may modify the non-AP MLD 12 according to the principle of the invention for the non-AP MLD 12 to receive the stream via one of the plurality of links or receive the streams via the plurality of links according to the channel condition. Further, while in the embodiment of the invention when the non-AP MLD 12 operates in the baseline mode, the link 141 and the link 142 may respectively perform transmissions of N spatial streams, in some embodiments, the number of the spatial streams on the link 141 and the link 142 may be unequal. For example, in the baseline mode, N1 spatial streams may be transmitted over the link 141, N2 spatial streams may be transmitted over the link 142. In the enhanced mode, one of link 141 and the link 142 may transmit (N1+N2) spatial streams. Furthermore, while the downlink transmission has been used to explain the operations in the embodiment of the invention, those skilled in the art may apply the present invention to uplink transmission according to a similar principle of the present invention.

The non-AP MLD 12 switches between the baseline mode and the enhanced mode according to the channel conditions, increasing the overall throughput by exploiting flexibility of the multi-link and multi-radio circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of switching an operation mode of a first multi-link device (MLD), the method comprising:
   the first multi-link device establishing a plurality of links to a second multi-link device;
   the first multi-link device determining, according to a channel condition, whether to receive a plurality of streams via the plurality of links or via one of the plurality of links; and
   if the first multi-link device is going to perform a non-simultaneous transmit and receive operation, determining to receive the multiple streams via one of the plurality of links.

2. The method of claim 1, wherein the first multi-link device determining, according to the channel condition, whether to receive the plurality of streams via the plurality of links or via one of the plurality of links comprises: when the channel condition is busy, the first multi-link device determining to receive the plurality of streams via one of the plurality of links.

3. The method of claim 1, wherein the first multi-link device determining, according to the channel condition, whether to receive the plurality of streams via the plurality of links or via one of the plurality of links comprises: when the channel condition is idle, the first multi-link device determining to receive the plurality of streams via the plurality of links.

4. The method of claim 1, further comprising:
the first multi-link device estimating the channel condition according to a channel busy time and a data transmission time of the first multi-link device during a measurement time.

5. The method of claim 1, further comprising:
the first multi-link device receiving a network load report from the second multi-link device; and
the first multi-link device estimating the channel condition according to the network load report.

6. A first multi-link device comprising:
a plurality of radio circuits configured to establish a plurality of links to a second multi-link device; and
a processor coupled to the plurality of radio circuits, and configured to determine whether to receive a plurality of streams via the plurality of links or via one of the plurality of links, wherein:
if the first multi-link device is going to perform a non-simultaneous transmit and receive operation, the processor is further configured to determine to receive the plurality of streams via one of the plurality of links.

7. The first multi-link device of claim 6, wherein when the channel condition is busy, the processor is configured to determine to receive the plurality of streams via one of the plurality of links.

8. The first multi-link device of claim 6, wherein when the channel condition is idle, the processor is configured to determine to receive the plurality of streams via the plurality of links.

9. The first multi-link device of claim 6, wherein:
the processor is further configured to estimate the channel condition according to a channel busy time and a data transmission time of the first multi-link device during a measurement time.

10. The first multi-link device of claim 6, wherein:
the first multi-link device is further configured to receive a network load report from the second multi-link device; and
the processor is further configured to estimate the channel condition according to the network load report.

* * * * *